(12) United States Patent
Rossi

(10) Patent No.: US 12,420,957 B1
(45) Date of Patent: Sep. 23, 2025

(54) STARSHADE

(71) Applicant: LOCKHEED MARTIN CORPORATION, Bethesda, MD (US)

(72) Inventor: George Richard Rossi, East Palo Alto, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 723 days.

(21) Appl. No.: 17/736,862

(22) Filed: May 4, 2022

(51) Int. Cl.
*B64G 1/22* (2006.01)
*B64G 1/10* (2006.01)

(52) U.S. Cl.
CPC ........... *B64G 1/222* (2013.01); *B64G 1/1057* (2023.08)

(58) Field of Classification Search
CPC .............................. B64G 1/222; B64G 1/1057
See application file for complete search history.

(56) References Cited

U.S. PATENT DOCUMENTS

| 8,480,241 B1 * | 7/2013 | Tenerelli | B64G 1/222 343/915 |
| 11,009,695 B2 * | 5/2021 | Freebury | H01Q 15/161 |
| 2017/0254929 A1 * | 9/2017 | Dailey | B64G 1/105 |

FOREIGN PATENT DOCUMENTS

CN 108516112 A * 11/2023 ............... B64G 1/66

* cited by examiner

*Primary Examiner* — Thomas K Pham
*Assistant Examiner* — Ruby L Kauffman
(74) *Attorney, Agent, or Firm* — BAKERHOSTETLER

(57) ABSTRACT

A starshade is provided that includes a circular base and opaque petals pivotably coupled to a perimeter of the circular base. The opaque petals are configured to pivot radially outward from a center axis of the circular base, wherein each of the opaque petals overlaps at least a portion of an adjacent opaque petal, and wherein each of the opaque petals tapers outward through a proximal section of the opaque petal and tapers inward through a distal section of the opaque petal.

11 Claims, 8 Drawing Sheets

STARSHADE

STATEMENT REGARDING FEDERALLY SPONSORED RESEARCH OR DEVELOPMENT

Not applicable.

TECHNICAL FIELD

The present description relates generally to space-based imaging including, for example, a starshade for a space-based telescope observing system.

BACKGROUND

Scientists are searching for planets around other stars to study and explore whether they could harbor life. Techniques such as transit and radial velocity have led to the discoveries of hundreds of exoplanets. The next phase in studying these newly discovered exoplanets is the direct imaging of the exoplanets. However, the proximity of these exoplanets to bright stars presents challenges to direct imaging of the exoplanets.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Scientists are discovering numerous exoplanets and are working to determine if any of them could harbor life. Direct imaging of the exoplanets may provide important information to determine the possibilities of supporting life on the exoplanets. However, direct imaging of these exoplanets presents challenges. The challenges include the proximity of the exoplanets to bright stars that might saturate image sensors and prevent quality imaging of the exoplanets. Among the solutions for improving direct imaging of exoplanets, space-based telescope-starshade observing systems are proposed. In these systems, a starshade partially blocks the light of a star by positioning the telescope to be in the shadow of the starshade without blocking direct imaging of an exoplanet near the star.

Figure 1:
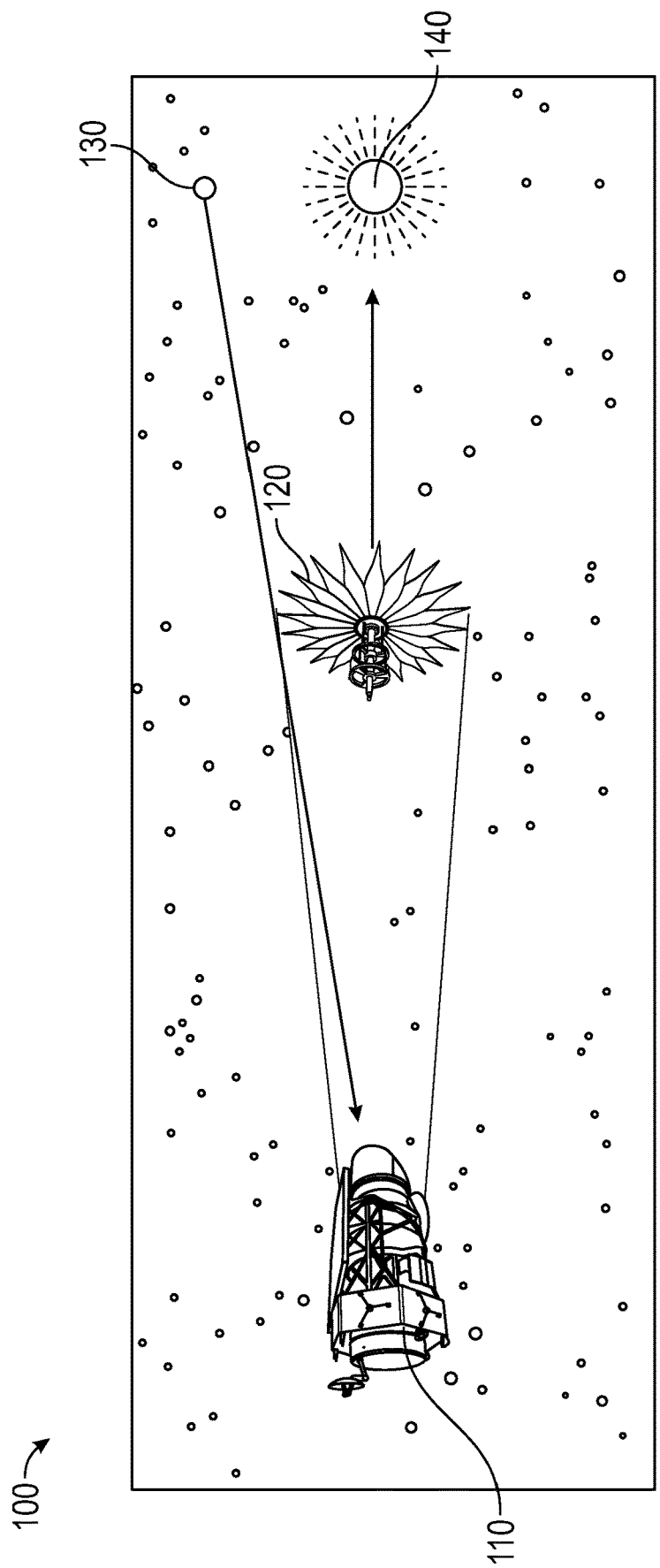
FIG. 1 is a diagram illustrating a telescope-starshade observing system according to aspects of the subject technology.

FIG. 1 is a diagram illustrating a telescope-starshade observing system according to aspects of the subject technology. The telescope-starshade observing system 100 includes a space-based telescope 110 and a starshade 120. The telescope 110 is positioned to image exoplanet 130, which is near star 140. As depicted in FIG. 1, the relative positions of the telescope 110 and the starshade 120 are arranged such that the telescope 110 is in the shadow of the starshade 120 to at least partially block the telescope 110 from the light emitted by the star 140 while the telescope 110 images the exoplanet 130.

Packaging the starshade for launch into space presents challenges. For example, a starshade may be 26 meters in diameter in its deployed state while the diameter of the payload volume of a rocket may be less than 5 meters. The subject technology provides a robust design for a starshade that can be stowed in the payload volume of different rockets and easily be deployed once launched into space. According to aspects of the subject technology, the starshade includes a circular base with opaque petals pivotably coupled to a perimeter of the circular base. In a stowed position, the opaque petals and the circular base form a cylindrical shape or a right conical frustum shape that aligns with the payload volume of the rocket. Once in space, the opaque petals are pivoted radially outward from a center axis of the circular base into a deployed position. Details of the starshade are provided in the description below.

Figure 2:
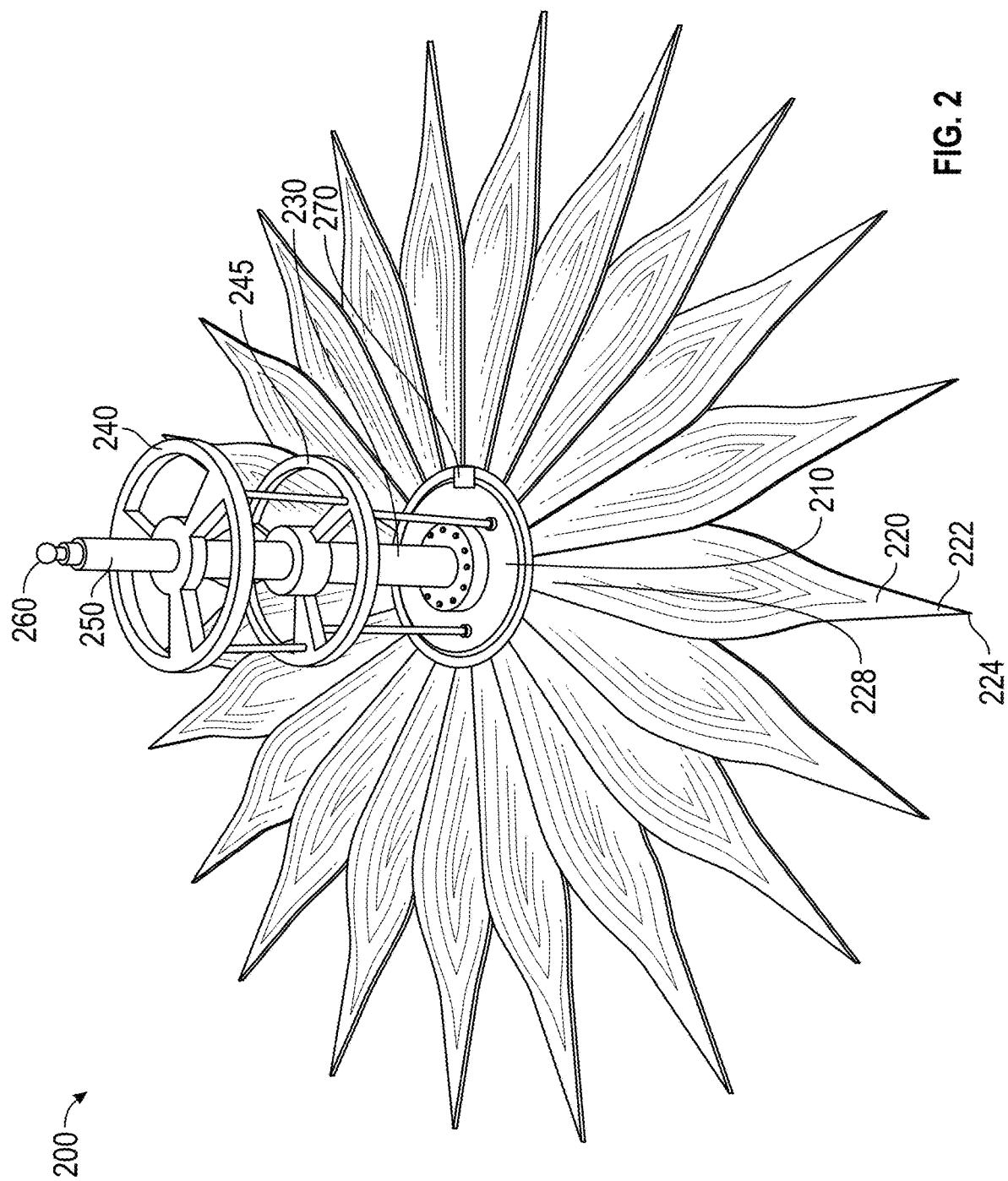
FIG. 2 is a diagram illustrating components of a starshade in a deployed position according to aspects of the subject technology.

FIG. 2 is a diagram illustrating components of a starshade according to aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As depicted in FIG. 2, starshade 200 includes a circular base 210, opaque petals 220, a support column 230, support rings 240 and 245, pedestal 250, and laser tracker 260. Opaque petals 220 may be pivotably coupled to a perimeter of the circular base 210 and are shown in a deployed position. Each of the opaque petals 220 at least partially overlaps the adjacent opaque petals on each side. For example, each of the opaque petals may overlap on top of the adjacent opaque petal to one side and overlap beneath the adjacent opaque petal to the other side. With this arrangement, pivoting one of the opaque petals radially towards a center axis of the circular base 210, along which the support column 230 is perpendicularly mounted in the center of the circular base 210, or radially outwards away from the center axis causes all of the opaque petals to move together. Accordingly, a single actuator 270 may be coupled to one of the opaque petals and be configured to move all of the opaque petals from a stowed position, with a maximum amount of overlap of the opaque petals, to a deployed position, with a minimum amount of overlap of the opaque petals, or from the deployed position to the stowed position by pivoting the coupled opaque petal. The subject technology is not limited to this arrangement and the starshade 200 may be configured with more actuators or other types of motion devices to pivot the opaque petals. For example, two actuators, four actuators, or more actuators may be arranged around the circular base and coupled to respective opaque petals and work together to deploy or stow all of the opaque petals pivotably coupled to the circular base.

Figure 3:
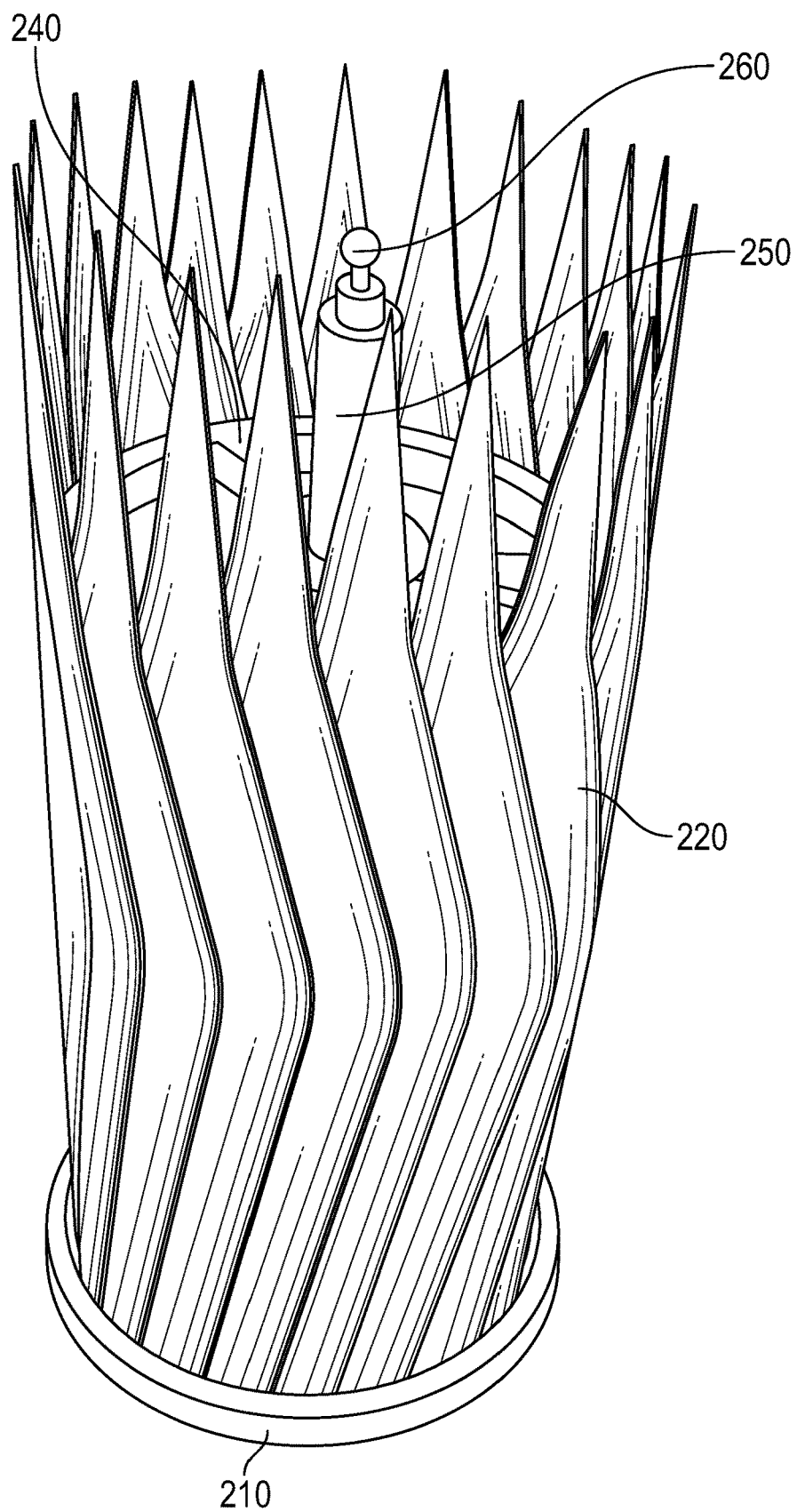
FIG. 3 is a diagram illustrating components of a starshade in a stowed position according to aspects of the subject technology.

FIG. 3 is a diagram illustrating components of a starshade in a stowed position according to aspects of the subject technology. As depicted in FIG. 3, the opaque petals 220 are in a position perpendicular to a face of the circular base 210. The opaque petals 220 may be supported on their inner surface 228 by the support rings 240 and 245 mounted to support column 230. While two support rings are depicted in FIG. 2, the subject technology is not limited to this number of support rings and may be implemented with one support ring or with more than two support rings to provide additional stabilization against launch vibrations. In this stowed position, the circular base 210 and the opaque petals 220 form a cylindrical shape that may align with a payload volume of a rocket used to launch the starshade into space. When placed in a payload volume, foam or another shock absorbing material may be placed between the inner surfaces of the opaque petals and the support rings and between the outer surfaces of the opaque petals and a rocket fairing forming the payload volume to stabilize the opaque petals against launch vibrations. When the starshade is in the stowed configuration depicted in FIG. 3, a maximum amount of overlap between the opaque petals occurs which also contributes to stabilizing the starshade against launch vibrations.

Figure 4:
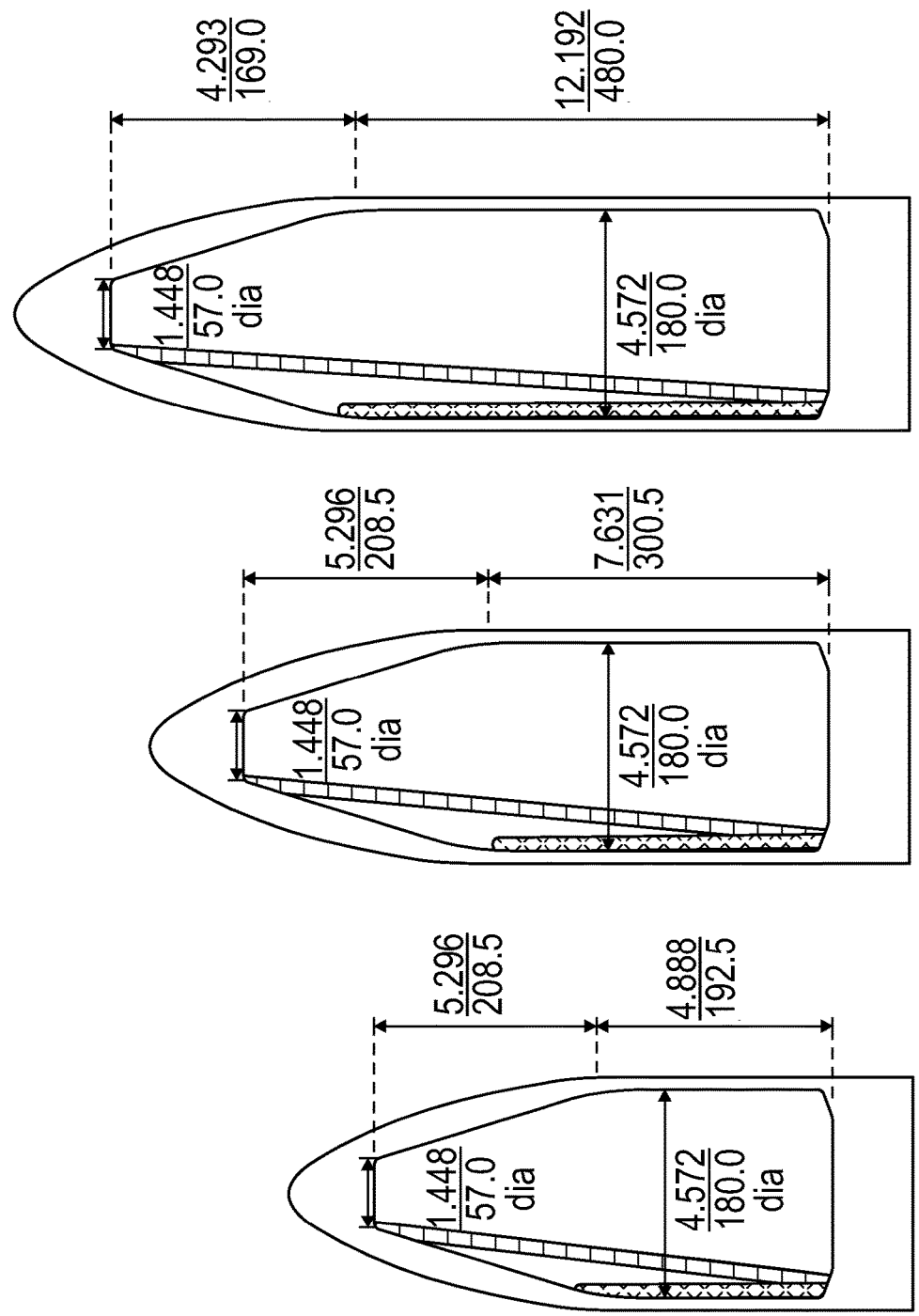
FIG. 4 are diagrams illustrating payload volume dimensions of three different sizes of rockets according to aspects of the subject technology.

FIG. 4 are diagrams illustrating payload volume dimensions of three different sizes of rockets according to aspects of the subject technology. Each of the payload volumes includes a cylindrical portion at the base topped by a conical portion. The dimensions of the payload volumes limit the size of the starshade that can be stowed inside each size rocket for launch. For example, the diameter of the deployed starshade is approximately equal to the diameter of the circular base plus two of the lengths of the opaque petals. The diameter of the cylindrical section at the base represents the largest diameter of circular base that can be stowed in the payload volume. The height of the cylindrical portions limits the length of the opaque petals that can be coupled to the circular base when the circular base and the opaque petals form a cylindrical shape in a stowed position. If the support rings are designed smaller in diameter, the opaque petals may form a right conical frustum in the stowed position and thereby may extend up into the conical section of the payload volume when in the stowed position. For the short rocket payload volume, the starshade may have a deployed diameter of ~14.3 meters for the cylindrical stowed configuration and ~25 meters for the right conical frustum stowed configuration; for the medium rocket payload volume, the starshade may have a deployed diameter of ~20 meters for the cylindrical stowed configuration and ~30.4 meters for the right conical frustum stowed configuration; and for the long rocket payload volume, the starshade may have a deployed diameter of ~30 meters for the cylindrical stowed configuration and ~37.5 meters for the right conical frustum stowed configuration.

Figure 5:
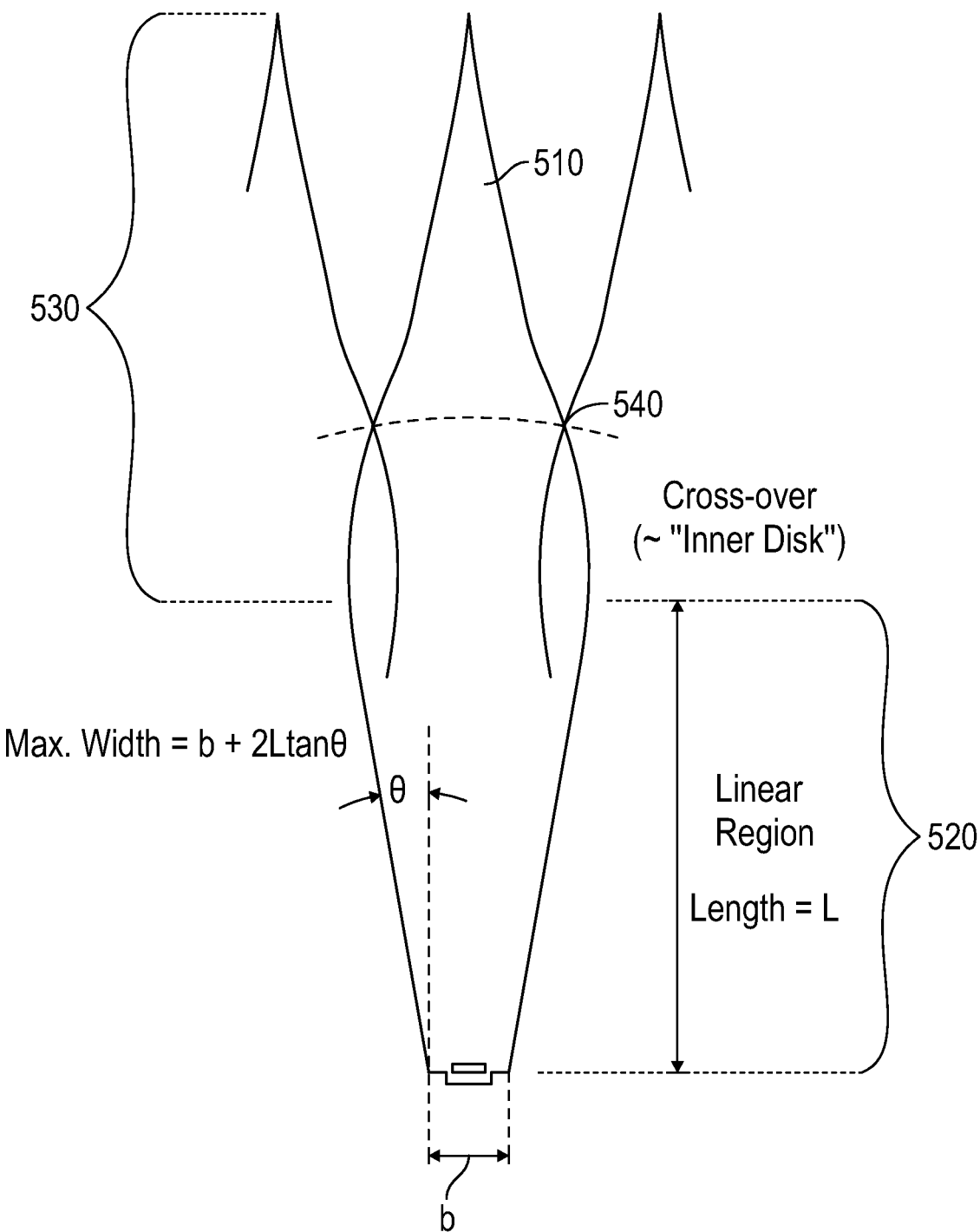
FIG. 5 is a diagram illustrating an opaque petal according to aspects of the subject technology.

FIG. 5 is a diagram illustrating an opaque petal according to aspects of the subject technology. As illustrated in FIG. 5, the opaque petal 510 tapers outward through a proximal section 520 and then tapers inward to a point through a distal section 530. When in the deployed position, the crossover point 540, which is where adjacent opaque petals no longer overlap, defines the dimensions of the inner disk of the starshade. The inner disk of the starshade is that portion of the starshade where light from the blocked star cannot pass directly through the structure of the starshade due to the overlapping opaque petals. The regions of the starshade outside of the inner disk allow some light from the blocked star to pass between the pointed ends of the opaque petals. This arrangement reduces or eliminates Poisson's spot on the shaded telescope.

As illustrated in FIG. 5, the maximum width of the opaque petal is equal to $b+2L \tan \theta$, where b is the width of the base of the opaque petal that is coupled to the circular base, L is the length of the proximal section that is tapering outward, and $\theta$ is the angle at which the sides of the opaque petal taper outwards.

While a flat design for the opaque petals may reduce multiply reflected light between the petals better while in the deployed position, the stowed position of the starshade favors a curved shape to maximize use of the payload volume of the rocket. According to aspects of the subject technology, a cylindrical volume or a right conical frustum volume, depending on the payload configuration chosen, may be created with the payload volume dimensions. Extruding the flat shape of opaque petal 510 depicted in FIG. 5 and intersecting the extruded shape with a longitudinal slice of the cylindrical volume or the right conical frustum volume results in a curved shape of the opaque petal, such as depicted in FIGS. 2 and 3. In this manner, the opaque petal curves around a longitudinal axis of the opaque petal. The longitudinal axis is parallel to the center axis of the circular base when the opaque petals occupy a cylindrical volume in a stowed position.

The subject technology is not limited to a particular number of opaque petals. The number of petals selected for a particular design represents a tradeoff between mechanical complexity and the size of the inner disk of the starshade. As the number of opaque petals used in a design increases, which also increases the number of moving parts of the starshade, the angle $\theta$ illustrated in FIG. 5 can be decreased. A smaller angle $\theta$ allows the length L of the proximal section of the opaque petal to be increased while maintaining a reasonable depth of the curvature of the opaque petals. Increasing the length of the proximal section L of the opaque petal increases the size of the inner disk of the starshade.

The deeper the depth of curvature of the opaque petals, the more likely that light will be reflected off of the edges and/or surfaces of the opaque petals and reach the shaded telescope. To suppress these reflections from reaching the telescope, an opaque film, such as a polyimide film with light-absorbing black coating, may be connected to the edges of adjacent opaque petals. As the opaque petals are moved to a deployed position, the opaque film may stretch out like a fan between the adjacent opaque petals and block multiply reflected light between the opaque petals.

According to aspects of the subject technology, the relative positions of the opaque petals may be determined using a laser tracker. Referring back to FIGS. 2 and 3, laser tracker 260 is illustrated mounted on pedestal 250, where pedestal 250 is mounted on support ring 240 and is aligned with the center axis of the circular base 210. Spherically mounted retroreflectors 224 may be mounted on the distal ends 222 of the opaque petals. Mounting the laser tracker 260 on top of the pedestal 250 allows the laser tracker to be equidistant to all of the retroreflectors 224 and to maintain line of sight with the retroreflectors 224 when the opaque petals are in the deployed position in order to scan the retroreflectors 224 to determine the position of the retroreflectors 224 relative to the laser tracker. In this manner, both an elevation angle away from the center axis and an azimuth angle around the center axis of the distal end 222 of each of the opaque petals may be determined.

Figure 6:
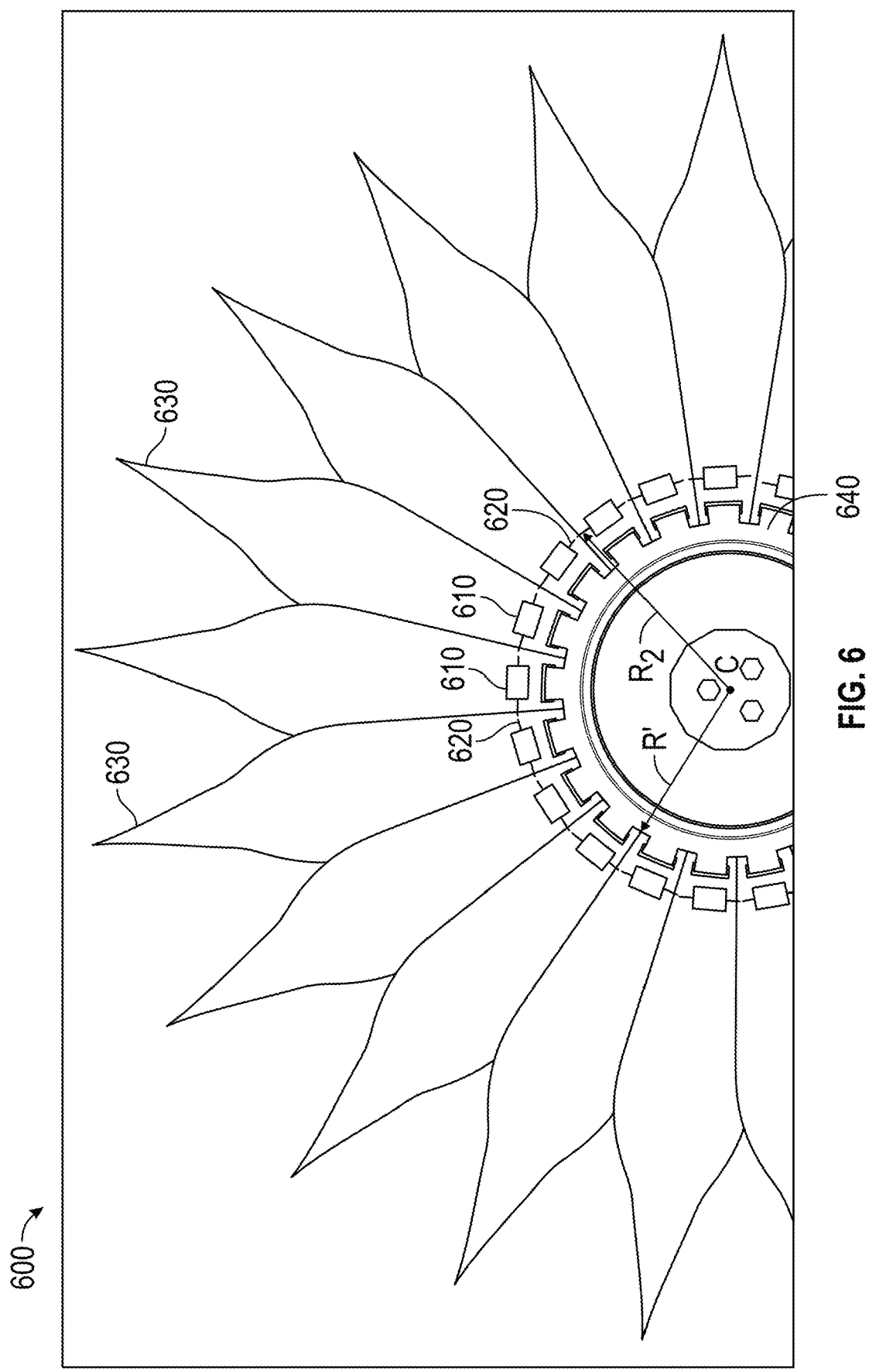
FIG. 6 is a diagram illustrating an arrangement of motors and leadscrews for adjusting azimuth between adjacent opaque petals in a deployed configuration according to aspects of the subject technology.

To correct thermally induced position error or a possible delta between pre-launch and in-space petal position, the positions determined by the laser tracker may be used to control the relative positions of the opaque petals on the starshade. With respect to the azimuth angles of the opaque petals, a motor and gearbox with a leadscrew may be mounted on the opaque petals for each adjacent pair of opaque petals. FIG. 6 is a diagram illustrating an arrangement of motors and gearboxes with leadscrews for adjusting azimuth angles between adjacent opaque petals according to aspects of the subject technology. As depicted in FIG. 6, a motor and gearbox 610 and leadscrew 620 are mounted on each opaque petal 630 and are associated with a respective pair of opaque petals 630. Motor and gearbox 610 and leadscrew 620 may be mounted to posts on a baseplate (not shown) attached to a portion of the respective opaque petal that is not overlapped by an adjacent opaque petal in either the stowed position or the deployed position. A thickness of the baseplate may vary such that the side of the baseplate that is in contact with opaque petal 630 is curved to match the shape of opaque petal 630, and the opposite side of the baseplate is flat to provide a surface for mounting gearbox 610 and leadscrew 620. The baseplate may be made of any material such as a metal or a metal-composite.

Driving the motor and gearbox 610 rotates the leadscrew 620 which alters the azimuth angle of the pair of opaque petals 630 associated with that motor and gearbox. The gearbox gears up the motor so that multiple rotations of the motor effect small, precise changes in the azimuth angle. In addition, the gearbox may be configured to disengage until the opaque petals are in an in-space, deployed position since the azimuth angles will change greatly as the opaque petals transition from a stowed position to the deployed position. Relative to the deployed position, the stowed position of the opaque petals may result in more overlap between adjacent opaque petals and less non-overlapped space on the opaque petals for mounting the motor and gearboxes and leadscrews. To accommodate the reduction in mounting space while the opaque petals are in the stowed position, the motor and gearboxes and leadscrews may be mounted closer to the edge of the opaque petals and oriented so that the leadscrews are substantially parallel to the edge of the opaque petals. A connecting rod may couple a post on an adjacent opaque petal to a nut mounted on the leadscrew. As the leadscrew is driven, the nut moves up and down the leadscrew and changes the azimuth angle of the adjacent opaque petal via the connecting rod.

With respect to the elevation angle of the opaque petals, each opaque petal may have an actuator 640 for relatively fine adjustments of the elevation angle of the opaque petal. Alternatively, for designs with no on-orbit elevation control, the deployment actuators may rotate the opaque petals to a deployed position against shims or other mechanical structures that are installed in the starshade prior to launch.

FIG. 6 depicts a radial distance $R_2$ from the center position C to the posts used to mount the leadscrews on the opaque petals. FIG. 6 also depicts a radial distance R' which is the radial distance in the plane of the circular base from the center position C to the inner surface of the opaque petals when the starshade is in the stowed position. The distance between the leadscrew posts when the opaque petals are in the deployed position is $$\frac{2\pi R_2}{N}$$

where N is the number of opaque petals used in the starshade. Similarly, the distance between leadscrew posts when the opaque petals are in the stowed position is $$\frac{2\pi R\prime}{N}$$

where N is the number of opaque petals used in the starshade. The stroke length needed for the leadscrew as a fraction of the distance between posts for the leadscrews on adjacent opaque petals in the deployed position is approximately $$\frac{R_2 - R\prime}{R_2}.$$

$R_2$ may be selected so that the stroke length is compatible with the available space taking into account the size of the motor and gearbox and the mounting of these components on the opaque petals.

Figure 7:
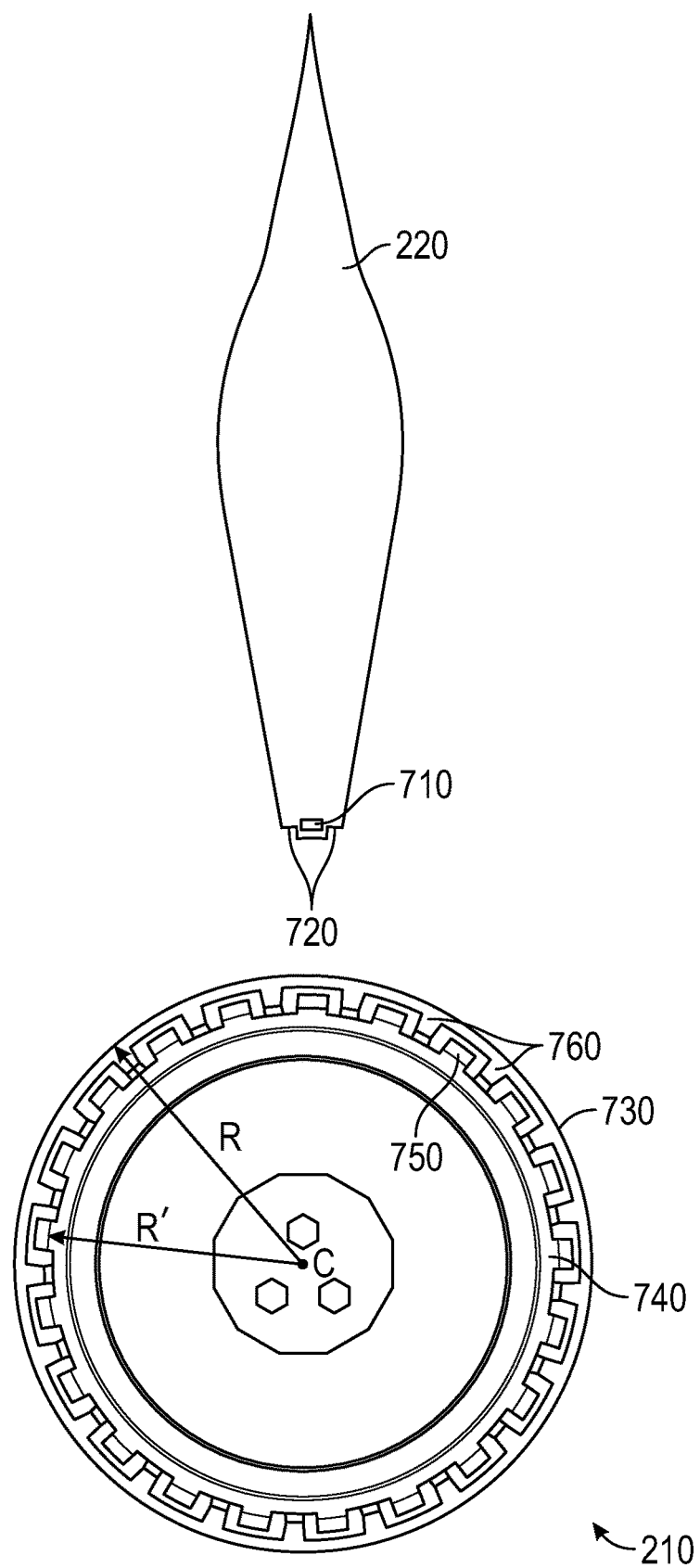
FIG. 7 is a diagram illustrating an example of the structure for pivotably coupling an opaque petal to a circular base according to aspects of the subject technology.

As noted above, the opaque petals are pivotably coupled to a perimeter of the circular base. FIG. 7 is a diagram illustrating an example of the structure for pivotably coupling an opaque petal to the circular base according to aspects of the subject technology. As depicted in FIG. 7, opaque petal 220 includes slot 710 with adjacent shoulders 720 on an end of opaque petal 220 that is pivotably coupled to circular base 210. The end of opaque petal 220 is positioned between rim 730 and inner disk 740 of circular base 210. When opaque petal 220 is pivotably coupled to circular base 210, tongue 750 of circular base 210 extends through slot 710 of opaque petal 220 and shoulders 720 of opaque petal 220 sit on lands 760 of circular base 210. The end of opaque petal 220 is secured against inner disk 740 with a ring (not shown) arranged on the opposite side of circular base 210. Alternatively, rim 730 may be segmented, with each segment configured to secure a respective opaque petal against the inner disk of the circular base. When being deployed, opaque petal 220 pivots radially outward away from the center axis of circular base 210 rotating about an axis aligned with shoulders 720 sitting on lands 760. The subject technology is not limited to foregoing arrangement for pivotably coupling the opaque petals to the circular base. Any sort of hinging mechanism which allows the opaque petals to pivot radially outward away from the center axis of the circular base may be used. FIG. 7 also depicts from a center C of circular base 210, a radius R of circular base 210 and radius R' which is the radial distance in the plane of circular base 210 from the center position C to the inner surface of the opaque petals when the starshade is in the stowed position.

Figure 8:
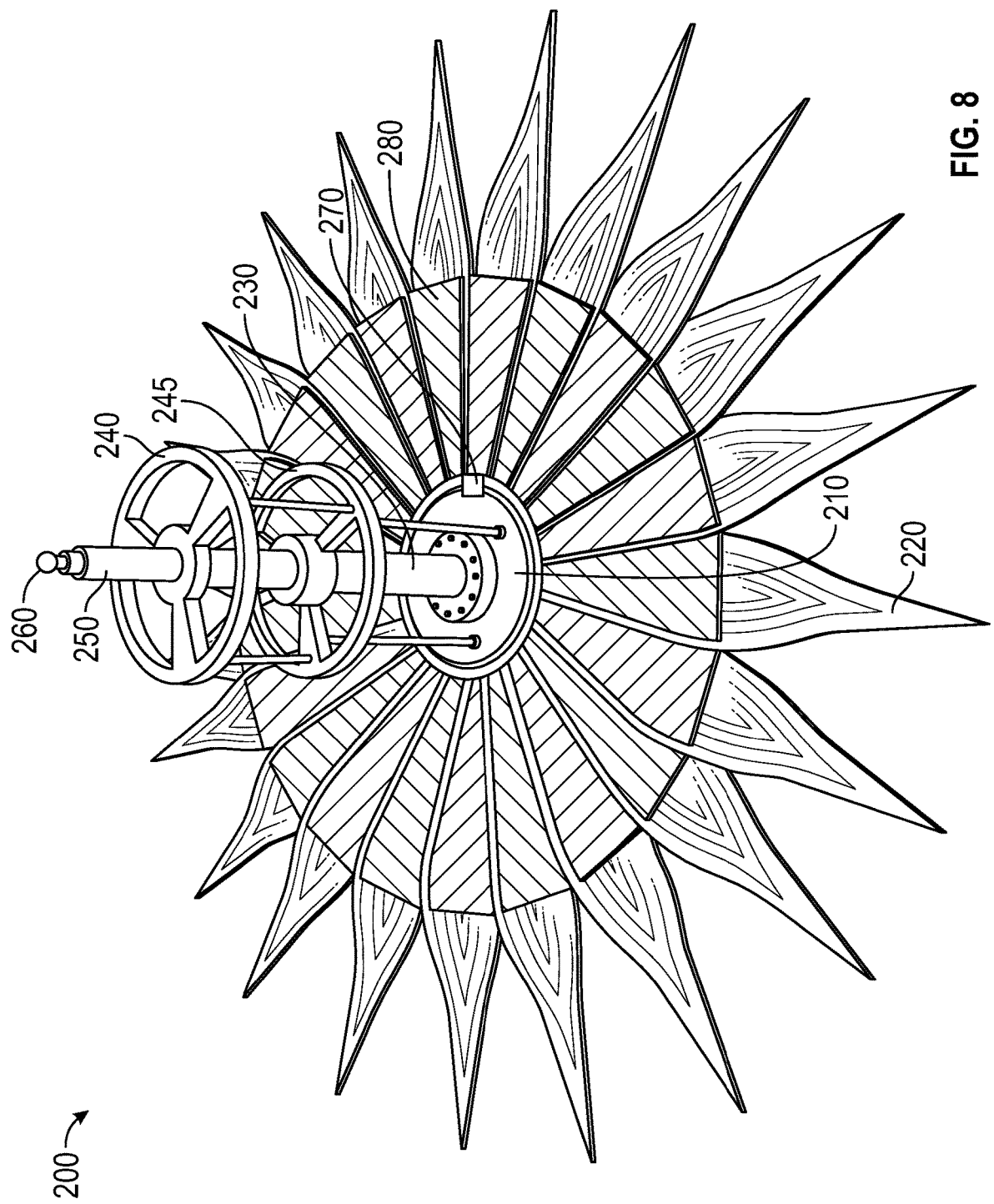
FIG. 8 is a diagram illustrating components of a starshade according to aspects of the subject technology.

The deeper the depth of curvature of the opaque petals, the more likely that light will be reflected off of the edges and/or surfaces of the opaque petals and reach the shaded telescope. To suppress these reflections from reaching the telescope, an opaque film, such as a polyimide film with light-absorbing black coating, may be connected to the edges of adjacent opaque petals. FIG. 8 is a diagram illustrating components of a starshade according to aspects of the subject technology. As depicted in FIG. 8, opaque film 280 is attached to edges of adjacent opaque petals 220. As opaque petals 220 are moved to a deployed position, opaque film 280 may stretch out like a fan between adjacent opaque petals 220, as shown in FIG. 8, and block multiply reflected light between the opaque petals. A similar arrangement of opaque film may be applied to the opposite side of opaque petals 220 in the alternative or in addition to the arrangement of opaque film represented in FIG. 8.

The subject technology is not limited to fabricating the opaque petals and/or the circular base out of any particular material. The material should be opaque to the light generated by the star. For example, the opaque petals and/or the circular base may be made out of a carbon fiber composite. Manufacturing the opaque petals out of a carbon fiber composite makes the opaque petals resilient to possible micrometeoroid strikes while in space. The curve of the opaque petals described above helps to increase structural rigidity of the opaque petals.

According to aspects of the subject technology, a starshade is provided that includes a circular base and a plurality of opaque petals pivotably coupled to a perimeter of the circular base. An actuator may be coupled to the plurality of opaque petals and configured to pivot the plurality of opaque petals radially outward from a center axis of the circular base.

Each of the plurality of opaque petals may taper outward through a proximal section of the opaque petal and taper inward through a distal section of the opaque petal. Each of the plurality of opaque petals may be curved around a longitudinal axis of the respective opaque petal. The longitudinal axis of the respective opaque petal may be parallel with the center axis of the circular base when the respective opaque petal is in a position perpendicular to a face of the circular base.

Each of the plurality of opaque petals may overlap at least a portion of an adjacent opaque petal of the plurality of opaque petals. The circular base and the plurality of opaque petals may form a cylindrical shape with the plurality of opaque petals in a stowed position. The circular base and the plurality of opaque petals may form a right conical frustum shape with the plurality of opaque petals in a stowed position.

The starshade may further include a support column mounted on the circular base along the center axis of the circular base, and one or more rings mounted on the support column concentrically with the circular base, wherein the one or more rings are configured to support an inner surface of the plurality of opaque petals in a stowed position. The starshade may further include a pedestal mounted on the support column along the center axis of the circular base, a plurality of spherically mounted retroreflectors mounted on distal ends of respective ones of the plurality of opaque petals, and a laser tracker mounted on the pedestal and configured to determine relative positions of the plurality of spherically mounted retroreflectors. The starshade may further include a plurality of azimuth motors and gearboxes mounted to the plurality of opaque petals and configured to control azimuth positions of the plurality of opaque petals.

According to aspects of the subject technology, a starshade is provided that includes a circular base and a plurality of opaque petals pivotably coupled to a perimeter of the circular base. The plurality of opaque petals are configured to pivot radially outward from a center axis of the circular base, wherein each of the plurality of opaque petals overlaps at least a portion of an adjacent opaque petal of the plurality of opaque petals, and wherein each of the plurality of opaque petals tapers outward through a proximal section of the opaque petal and tapers inward through a distal section of the opaque petal.

The starshade may further include an actuator coupled to the plurality of opaque petals and configured to pivot the plurality of opaque petals radially outward from the center axis of the circular base. Each of the plurality of opaque petals may be curved around a longitudinal axis of the respective opaque petal. The longitudinal axis of the respective opaque petal may be parallel with the center axis of the circular base when the respective opaque petal is in a position perpendicular to a face of the circular base. The circular base and the plurality of opaque petals may form a cylindrical shape with the plurality of opaque petals in a stowed position. The circular base and the plurality of opaque petals may form a right conical frustum shape with the plurality of opaque petals in a stowed position.

The starshade may further include a support column mounted on the circular base along the center axis of the circular base, and one or more rings mounted on the support column concentrically with the circular base, wherein the one or more rings are configured to support an inner surface of the plurality of opaque petals in a stowed position. A pedestal may be mounted on the support column along the center axis of the circular base with a plurality of spherically mounted retroreflectors mounted on distal ends of respective ones of the plurality of opaque petals and a laser tracker mounted on the pedestal and configured to determine relative positions of the plurality of spherically mounted retroreflectors. The starshade may further include a plurality of azimuth motors and gearboxes mounted to the plurality of opaque petals and configured to control azimuth positions of the plurality of opaque petals. The starshade may further include a plurality of elevation actuators mounted to the plurality of opaque petals, respectively, and configured to control elevation positions of the plurality of opaque petals.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The invention claimed is:

1. A starshade, comprising:
a circular base;
a plurality of opaque petals pivotably coupled to a perimeter of the circular base;
an actuator coupled to the plurality of opaque petals and configured to pivot the plurality of opaque petals radially outward from a center axis of the circular base;
a plurality of spherically mounted retroreflectors mounted on distal ends of respective ones of the plurality of opaque petals; and
a laser tracker coupled to the circular base and configured to determine relative positions of the plurality of spherically mounted retroreflectors.

2. The starshade of claim 1, wherein each of the plurality of opaque petals tapers outward through a proximal section of the opaque petal and tapers inward through a distal section of the opaque petal.

3. The starshade of claim 1, wherein each of the plurality of opaque petals is curved around a longitudinal axis of the respective opaque petal.

4. The starshade of claim 3, wherein the longitudinal axis of the respective opaque petal is parallel with the center axis of the circular base when the respective opaque petal is in a position perpendicular to a face of the circular base.

5. The starshade of claim 1, wherein each of the plurality of opaque petals overlaps at least a portion of an adjacent opaque petal of the plurality of opaque petals.

6. The starshade of claim 1, wherein the circular base and the plurality of opaque petals form a cylindrical shape with the plurality of opaque petals in a stowed position.

7. The starshade of claim 1, wherein the circular base and the plurality of opaque petals form a right conical frustum shape with the plurality of opaque petals in a stowed position.

8. The starshade of claim 1, further comprising:
a support column mounted on the circular base along the center axis of the circular base; and
one or more rings mounted on the support column concentrically with the circular base, wherein the one or more rings are configured to support an inner surface of the plurality of opaque petals in a stowed position.

9. The starshade of claim 8, further comprising:
a pedestal mounted on the support column along the center axis of the circular base, wherein the laser tracker is mounted on the pedestal.

10. The starshade of claim 1, further comprising:
a plurality of motors and gearboxes mounted to the plurality of opaque petals and configured to control azimuth positions of the plurality of opaque petals.

11. The starshade of claim 1, further comprising:
an opaque film connecting edges of adjacent opaque petals of the plurality of opaque petals.

* * * * *